No. 724,220. PATENTED MAR. 31, 1903.
A. A. THOGERSEN.
CULTIVATOR.
APPLICATION FILED OCT. 21, 1902.
NO MODEL.
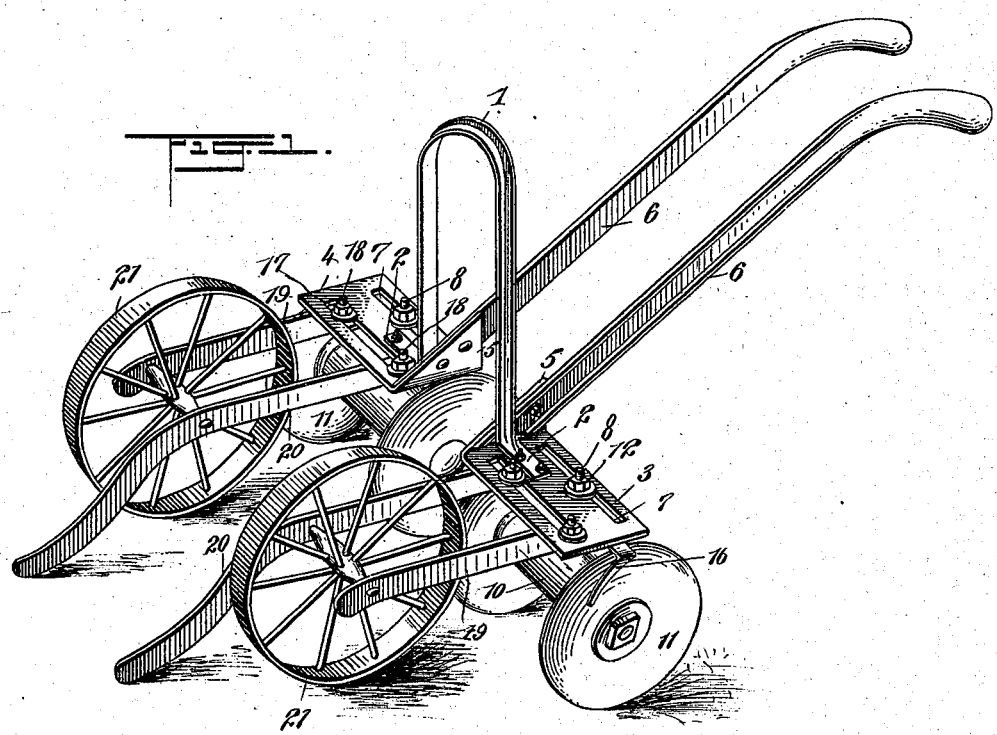
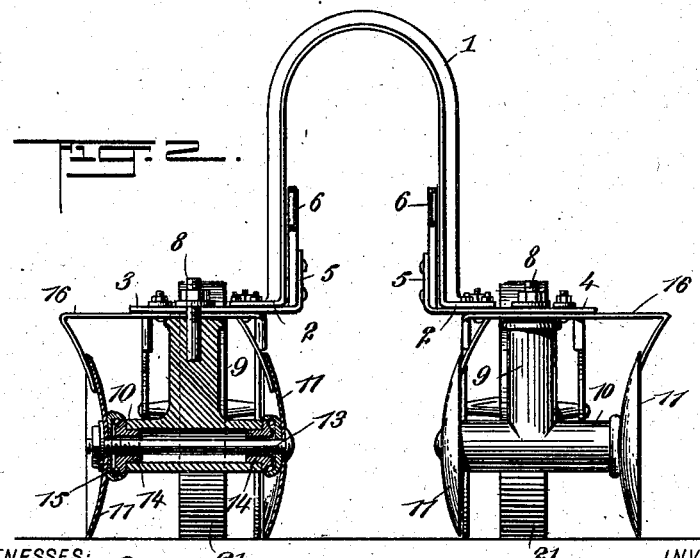
WITNESSES:
INVENTOR
Arthur A. Thogersen
BY
ATTORNEYS.

UNITED STATES PATENT OFFICE.

ARTHUR A. THOGERSEN, OF BROOKINGS, SOUTH DAKOTA.

CULTIVATOR.

SPECIFICATION forming part of Letters Patent No. 724,220, dated March 31, 1903.

Application filed October 21, 1902. Serial No. 128,123. (No model.)

*To all whom it may concern:*

Be it known that I, ARTHUR A. THOGERSEN, a citizen of the United States, and a resident of Brookings, in the county of Brookings and State of South Dakota, have invented a new and useful Improvement in Cultivators, of which the following is a full, clear, and exact description.

This invention relates to certain novel and useful improvements in farm implements, and has particular application to cultivators of the type employed in gardens and nurseries for the cultivation and weeding of small plants.

It is the intention of the present invention to provide a cultivator the disks or ground-disintegrating parts of which may be so adjusted relative to the main frame or to the rows of plants that the soil may be thrown toward or away from such plants, as the occasion may require.

The invention also contemplates the provision of means whereby the ground-wheels and the bars or beams supporting the same may be shifted laterally to a sufficient degree to permit the passage of large plants or bushes.

A further object of the invention is to provide a machine of the class referred to which shall be durable in construction, while embodying at the same time the essential features of simplicity and inexpensiveness.

With these and other objects of a like nature in view the invention consists in providing a disk cultivator with means whereby the disks may be adjusted or reversed, as the exigencies of the occasion may demand, and, further, consists in so mounting the wheel-supporting bars or beams that such wheels and their accompanying parts are capable of being laterally adjusted.

It further consists in the peculiar construction, combination, and arrangement of parts, as will be hereinafter fully set forth and claimed.

While I have herein shown and described, for the sake of clearly illustrating the application of my improvement, my preferred form of cultivator, it will of course be apparent that modifications and changes might be made in the proportions and arrangement of the parts and in the minor details without departing from the essential features of the invention or sacrificing any of the advantages thereof.

Reference is to be had to the accompanying drawings, forming part of this specification, in which similar characters of reference indicate corresponding parts in both the figures.

Figure 1 is a perspective view of a cultivator of the disk type embodying my improvements; and Fig. 2 is a rear view of the same, portions thereof being in section to show the mounting of the cultivating-disks.

Referring to the drawings in detail, and in particular to Fig. 1 thereof, the numeral 1 designates the usual arch employed in implements of this character, the horizontal arms 2 2, formed at the extremities of the arch, being rigidly fastened to the slotted plates 3 and 4 in such manner that the same are held firmly spaced apart. These slotted plates, which for the sake of convenience I will hereafter term as "angle-plates," are normally adapted to lie in horizontal planes and preferably have their inner adjacent end portions cut away and turned upwardly at substantially right angles to the main body portion of the plate, as shown at 5 5, to partially support the handles 6 6, which are fastened or bolted to the plates in any desired manner. I prefer to form the angle-plates from sheet metal or similar material, but of course do not wish to be understood as limiting myself to a plate constructed in any particular form or of any specific material. These plates 3 and 4 are provided with suitable lateral slots, as at 7 7, which preferably extend nearly the entire width of the plate and are adapted to permit the passage therethrough of the spindles 8 8, which are rigidly secured to the shanks 9 9 of the bearings 10 10, which assist in supporting the cultivating-disks 11. The spindles, with their accompanying parts, are held securely in position by means of the nuts and washers, which are threaded upon the ends of the spindles, as at 12. When it is desired to adjust the disk gangs, it is only necessary to loosen the nut, and the disks may be readily shifted or moved in the slots to permit the desired adjustment. The disks themselves are held in the bearing sleeves or portions 10 in any desired manner, the disks being connected, as shown, by means of the axle pin or rod 13, which extends through the bearing-sleeve and rests upon suitable bearing-blocks 14 14, mounted in the ends of the sleeve. If desired, ball-bearings or other antifriction means, as at 15, may be interposed between the disks and the bearing-blocks 14; but this is a matter in which there may be deviation without affecting the principle of the invention.

Suitable scraping-blades or similar means, such as shown at 16 16, are mounted on the spindles 8 in such manner that they may be adjusted in any position relative to the disks 11 for the purpose of removing therefrom any soil which may be caked thereon.

A second slot, as at 17, extending substantially parallel with the first slot 7, is formed in each of the angle-plates, and said slots are adapted to permit the passage of the bolts 18 18, which are in turn secured to the bars or beams 19 19 and 20 20, supporting the ground-wheels 21 21. By loosening the nuts which retain the bolts 18 18 in position the wheel-supporting bars or beams may be shifted laterally, for the purposes hereinbefore mentioned. The lower ends of the inner bars or beams 20 20 are preferably extended and curved downwardly, as shown, by which construction various important functions are obtained. The ground or soil immediately adjacent to the row of plants is stirred up and rendered more susceptible to the disintegrating action of the disks.

There are many other advantages incident to my improved cultivator; but they are so evident that it is unnecessary to dwell upon the same here in detail. It will be observed, however, that the peculiar mounting of the scraper-blades enables them to be readily removed and others substituted and also that they are so arranged that the peripheries of the wheels are thoroughly cleaned without interfering with the operation of the implement.

Having thus described my invention, I claim as new and desire to secure by Letters Patent—

1. In an implement of the class described, a main frame, plates carried thereby, cultivating devices, scraping means for said cultivating devices, the ground-wheels, and means supported by said plates for adjusting the scraping devices and the ground-wheels.

2. In an implement of the class described, the combination of a main frame, slotted plates carried thereby, cultivating devices, the ground-wheels, scraping means for the cultivating devices, and means for adjusting the ground-wheels and the scraping devices along the slots in the plate, substantially as set forth.

3. In an implement of the class described, the combination of the arch or main frame, horizontally-disposed plates carried thereby, the cultivating-disks, bearings for said disks, a vertically-disposed shank carried by said bearing, a spindle carried by said shank and adapted to pass through the slotted plate, scraping devices carried by said spindle, and means for retaining the spindle and its connected parts in any predetermined position.

4. In an implement of the class described, the combination of the main frame or arch, the cultivating-disks and the ground-wheels, horizontally-disposed plates carried by said arch, and each provided with slots, means connected with the cultivating devices and passing through one of said slots for permitting the adjustment of said disks, and means passing through the other slot for permitting the adjustment of the ground-wheels, relative to the main frame.

5. A device of the class described, comprising a main frame, plates carried thereby, said plates having slots therein, cultivating devices adjustable in the slotted portions of the plates, relatively long, forwardly and downwardly extending beams adjustably mounted in said plates and having the ends thereof adapted to rest upon the ground, shorter beams parallel with the first-mentioned beams, and ground-wheels supported by said beams.

6. A device of the class described, comprising a main frame or arch, horizontally-disposed slotted plates carried by said arch, the inner ends of said plates being bent upwardly at right angles thereto, handles secured to the upwardly-turned portions of the plates, disk cultivating devices adjustably secured to said plates through means extending through one of the slots therein, scraping devices carried by said means, forwardly-extending beams secured to and capable of lateral adjustment relative to said plates, and ground-wheels carried by said beams.

7. A device of the class described, comprising a main frame or arch, horizontally-disposed slotted plates carried thereby, forwardly-extending beams adjustably secured to said plates through means extending through the slots, and ground-wheels carried by said beams, substantially as set forth.

8. A device of the class described, comprising the main frame, horizontally-disposed slotted plates carried thereby, disk cultivating means, and disk scraping devices carried by and adjustable on said plates, and forwardly and downwardly extending beams adjustably secured to said plates through means extending through said slots, substantially as set forth.

In testimony whereof I have signed my name to this specification in the presence of two subscribing witnesses.

ARTHUR A. THOGERSEN.

Witnesses:
PHILO HALL,
M. E. CULHANE.